(12) United States Patent
Scarth

(10) Patent No.: US 7,580,998 B2
(45) Date of Patent: Aug. 25, 2009

(54) METHOD FOR DESCRIBING PROBLEMS IN A TELECOMMUNICATIONS NETWORK

(75) Inventor: Gordon Bruce Scarth, Ottawa (CA)

(73) Assignee: Alcatel-Lucent Canada Inc., Ottawa, Ontario (CA)

( * ) Notice: Subject to any disclaimer, the term of this patent is extended or adjusted under 35 U.S.C. 154(b) by 871 days.

(21) Appl. No.: 10/606,896

(22) Filed: Jun. 27, 2003

(65) Prior Publication Data

US 2004/0073663 A1 Apr. 15, 2004

Related U.S. Application Data

(60) Provisional application No. 60/402,925, filed on Aug. 14, 2002.

(51) Int. Cl.
*G06F 15/173* (2006.01)

(52) U.S. Cl. .................. 709/224; 709/203; 709/223; 714/4; 714/43; 370/241

(58) Field of Classification Search ......... 709/223–226, 709/242; 714/4, 43, 46
See application file for complete search history.

(56) References Cited

U.S. PATENT DOCUMENTS

| 5,748,880 | A  | * | 5/1998 | Ito et al. ........................ 714/46 |
| 5,761,502 | A  | * | 6/1998 | Jacobs ......................... 709/242 |
| 6,072,777 | A  | * | 6/2000 | Bencheck et al. ........... 370/244 |
| 6,300,966 | B1 | * | 10/2001 | Gregory et al. ............. 709/224 |
| 6,430,712 | B2 | * | 8/2002 | Lewis ........................... 714/47 |
| 6,701,459 | B2 | * | 3/2004 | Ramanathan et al. ....... 709/224 |
| 6,810,496 | B1 | * | 10/2004 | Vittal ......................... 709/224 |
| 6,948,101 | B2 | * | 9/2005 | Saito .......................... 714/43 |
| 7,010,588 | B2 | * | 3/2006 | Martin et al. ................ 709/223 |
| 7,277,936 | B2 | * | 10/2007 | Frietsch ..................... 709/224 |
| 7,287,193 | B2 | * | 10/2007 | Ward .......................... 709/223 |
| 2002/0111755 | A1 | * | 8/2002 | Valadarsky et al. ........... 702/58 |
| 2003/0149919 | A1 | * | 8/2003 | Greenwald et al. ........... 714/43 |

* cited by examiner

*Primary Examiner*—Ramy Mohamed Osman
(74) *Attorney, Agent, or Firm*—Victoria Donnelly

(57) ABSTRACT

A method for describing problems in a telecommunications network is provided, wherein the alarms for a network service displayed on an operator's console are presented in the order of the path comprising the service and associated with respective network elements, followed by a description of a recommended corrective procedure for the alarms.

12 Claims, 9 Drawing Sheets

<u>Service</u>: San Fransisco service, Band: 4 Channel 1
$\underbrace{\hspace{5cm}}_{208}$ Service has 4 alarms currently active
$\underbrace{\hspace{5cm}}_{210}$ <u>Summary</u>: There are 0 equipment faults on this service
$\underbrace{\hspace{5cm}}_{212}$ Node 10.1.10.2, slot 4, port 1, channel ids 321, 654 are missing
$\underbrace{\hspace{5cm}}_{214}$ Node 10.1.10.2, slot 4, port 1, unexpected channel ids 123, 456
$\underbrace{\hspace{5cm}}_{216}$ Node 10.1.10.2, slot 5, port 1, channel ids 432, 765 are missing
$\underbrace{\hspace{5cm}}_{218}$ Node 10.1.10.2, slot 5, port 1, unexpected channel ids 234, 567
$\underbrace{\hspace{5cm}}_{220}$ <u>Recommendations</u>:

Check cabling on node 10.1.10.2, port 1 of slot 4 and port 1 of slot 5
$\underbrace{\hspace{5cm}}_{222}$

Fig. 8

METHOD FOR DESCRIBING PROBLEMS IN A TELECOMMUNICATIONS NETWORK

RELATED APPLICATION

This application claims priority from U.S. Provisional Patent Application Ser. No. 60/402,925 to Scarth, G. B., filed on 14 Aug. 2002, and entitled "Automatic Description of Optical Network Problems".

FIELD OF THE INVENTION

The invention relates to telecommunications networks, and, in particular, to the description of problems which cause alarms in a telecommunications network.

BACKGROUND OF THE INVENTION

As the complexity of telecommunications networks continues to grow, the level of required reliability and availability of the networks continues to rise correspondingly. These factors place an increasing burden on diagnostic systems that are used to isolate and correct network problems. For network service providers, quick and accurate problem diagnosis and correction is critically important.

Telecommunications networks typically have many elements, these elements being grouped into nodes. Each node contains one or more shelves, and each shelf contains one or more optical processing elements. An example of an optical processing element is a line card for a shelf, such as a WDM optical line card, which accepts as an interface a WDM optical fiber. The optical processing elements on a node are connected to other optical equipment, other optical processing elements within the same node, or other optical processing elements on another node. By connecting optical processing elements using optical fibers between different nodes, an optical network is formed.

A common objective of the optical network is to carry traffic in the form of optically encoded binary data. A service, in this context, can be defined as the ability to carry this traffic from one point to another in the optical network. The optical network generally supports more than one service.

Typically, problems arising in telecommunications networks are often expressed in the form of alarms. An alarm can generally be considered to be an event reported by a network element when an abnormal condition exists. Upon receiving the alarm, the network management system displays the alarm in a list of alarms on the operator's console, where each entry provides information such as the affected network entity and the type and seriousness of the alarm.

When alarms occur in the network, they impair the ability to successfully carry traffic, or in the worst case, cause all traffic to stop.

In a typical network management environment, a heterogeneous array of switching and transmission equipment may produce hundreds of alarms each day. The operator's console often shows alarms that are spurious, transient, time correlated, or too numerous to be handled at the same time. This causes fault diagnosis and correction to be a complex and error-prone task, where considerable experience is required to interpret and isolate network faults in an accurate and time-efficient manner.

Accordingly, there is a need in the telecommunications industry for further development of a method that provides more rapid and accurate fault diagnosis and correction than currently existing solutions.

SUMMARY OF THE INVENTION

It is therefore an object of the invention to provide a description of a problem in a telecommunications network which would avoid the above-mentioned drawbacks.

According to one aspect of the invention there is provided a method for describing a problem in a telecommunications network, comprising:

selecting a subset of alarms associated with a service;

grouping the selected subset of alarms in a number of groups;

arranging the grouped subset of alarms in the direction of the path of the service in the network; and transforming each alarm in each group of alarms into a problem description for the service.

Additionally, the method for describing a problem in a telecommunications network further comprises the step of providing a corrective procedure for one of the some and all alarms in the groups of the selected subset of alarms.

Beneficially, in the method for describing a problem in a telecommunications network, the network entities carrying the service comprise one or more of the following types: a node, a bay, a quadrant, a slot, a card and a port.

Conveniently, in the method for describing a problem in a telecommunications network, the step of grouping the selected subset of alarms comprises grouping the selected subset of alarms by one, or by one or more, of the network entities carrying the service.

Gainfully, in the method for describing a problem in a telecommunications network, the step of transforming each alarm further comprises the step of forming one or more templates, a template including text substitution markers. Beneficially, the text substitution markers correspond to network entities.

Additionally, in the method for describing a problem in a telecommunications network, the step of arranging the groups of alarms comprises arranging the groups of alarms in the direction of the path from the beginning of the path to the end of the path, or from the end of the path to the beginning of the path.

Conveniently, in the method for describing a problem in a telecommunications network, the type of problem is a missing channel identification (channel "id") alarm, an unexpected channel "id" alarm, a loss of signal alarm or a channel power out of range alarm.

Usefully, in the method for describing a problem in a telecommunications network, the description is a verbal description or a pictorial description. Conveniently, the verbal description is an English description.

BRIEF DESCRIPTION OF THE DRAWINGS

Embodiments of the invention will now be described with reference to the accompanying drawings in which:

FIG. 8 illustrates a sample problem description produced according to the method of FIG. 1.

DETAILED DESCRIPTION OF THE PREFERRED EMBODIMENTS

Figure 1:
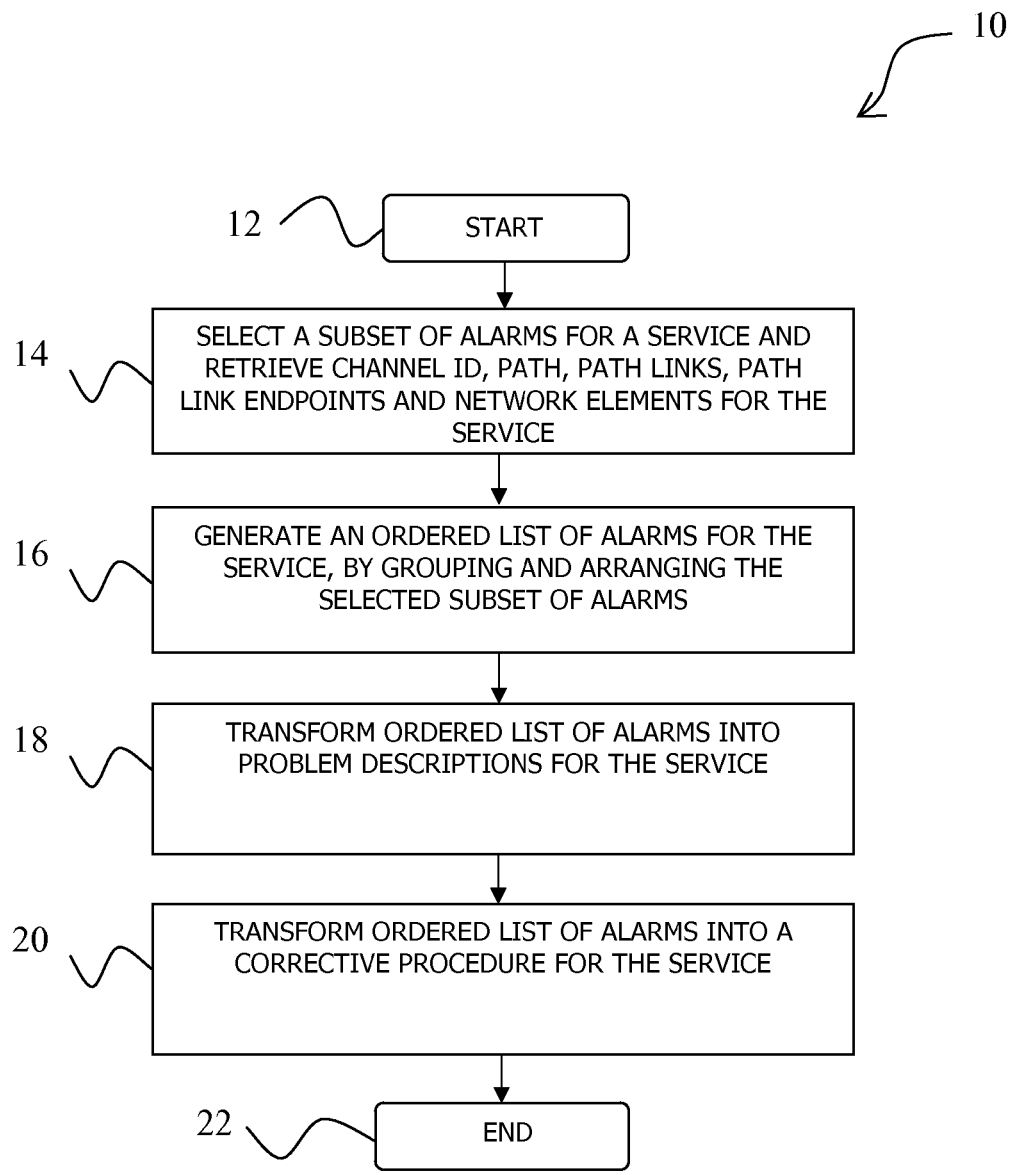
FIG. 1 is a flowchart illustrating a method for describing a problem in a telecommunications network according to a first embodiment of the invention.

An optical network includes a number of network elements, some or all of which being connected by optical links. The optical links are uni-directional, where optical traffic is ingress at one end, and egress at the other end, or a bi-directional link which would require two optical fibers for the connection. For the bi-directional link, each port connection would have an ingress optical flow and an egress optical flow, one for each optical fiber, respectively. Services are often bi-directional in nature, although uni-directional services can also be provided with uni-directional traffic flows.

A bi-directional service would require two uni-directional links, one for each direction, between the port connections on different optical processing elements. A uni-directional service would require only one uni-directional link.

The optical uni-directional links that are required to carry traffic for any particular service can be identified. They are optical links between network elements, such as optical links from one line card to another in the same node, one line card to another between different nodes, and one line card to other optical equipment. While a line card is used in this example, it is understood that any network elements may be used.

The uni-directional links can be ordered by the order in which the optical light flows, from the beginning of the optical flow, where the optical flow originated, to the end of the optical flow, where the optical flow terminates. For example, N uni-directional optical links can be ordered as L1, L2, L3, ... LN, where the ingress of L1 is the originating source of the optical flow, and the egress of LN is the termination of the optical flow. Typically, but not necessarily, the optical links are located on different nodes.

Faults to raise alarms can occur at the optical processing elements between two optical links Li and Lj, where i and j are link numbers of the ordered optical links, or within the optical link itself. An example of a fault within an optical link is where the optical link was bent or broken, creating a large optical power loss across the optical link. If the fault occurred at the optical processing elements between optical links Li and Lj, then the fault occurred anywhere between the ingress port connection of the optical port for Li and the port egress port connection of the optical port for Lj. The optical ports for Li and Lj may or may not be collocated on the same optical processing element.

In addition, for WDM networks, there are several wavelengths that flow through the same optical fiber. Each wavelength is an independent optical signal, or channel, capable of carrying traffic. In each instance, an optical channel in the network is uniquely identified by a channel identifier, or channel "id". The channel "id" is a combination of one or more relatively low frequencies (e.g. about 1 MHz or less), hereby known as dither tones, and is modulated onto the channel. The combination of dither tones for a channel may be selected using any coding scheme, such that each combination of dither tones is unique in the network, and therefore each channel "id" uniquely identifies the channel instance in the network.

Channels are added to an optical fiber at the ingress to an optical link, and later removed from the optical fiber at the egress of an optical link by optical processing elements. Hence, each optical link in the order list L1, L2, L3, ... , LN can carry many channels. Each channel can be associated with one or more services. In this case, the optical ports on the optical processing elements are capable of connecting to optical links carrying WDM channels. In addition, the optical processing elements may be capable of processing the WDM channels carried in the optical link.

If the optical processing elements can process the channels of the WDM signal, then in addition they may be capable of detecting the presence or absence of the channel at each optical link. Yet additionally, the optical processing elements may be capable of detecting the optical power of each WDM channel independently at each optical link.

A method for describing one or more problems for a service in a telecommunications network described above and according to a first embodiment of the invention is illustrated in FIG. 1 by flowchart 10.

At the start (box 12), information is provided on the service, including the service identifier and corresponding channel identifier, a WDM wavelength identifier, which can be in the form of an ITU Grid number, an identifier for a node at the start of the service, identifiers for the path endpoints of the links forming the path, identifiers for intermediate network entities, and an identifier for a node at the end of the service (box 14). For example, this information could be provided at a network management Server (NMS). Also, a subset of alarms is selected by examining the network entities carrying the path, and selecting the network entities with an alarm (box 14). Next, an ordered list of alarms is generated for the network entities carrying the service (box 16). The ordered list of alarms is generated in order of the direction of the path of the service, starting at the beginning of the path, progressing through alarms for path links and network entities comprising the path, and finishing at the end of the path. The ordered list of alarms is then transformed into one or more problem descriptions for the service (box 18). Next, the ordered list of alarms is transformed into a description of a corrective procedure for the problems (box 20), and the process is complete (box 22).

Figure 2:
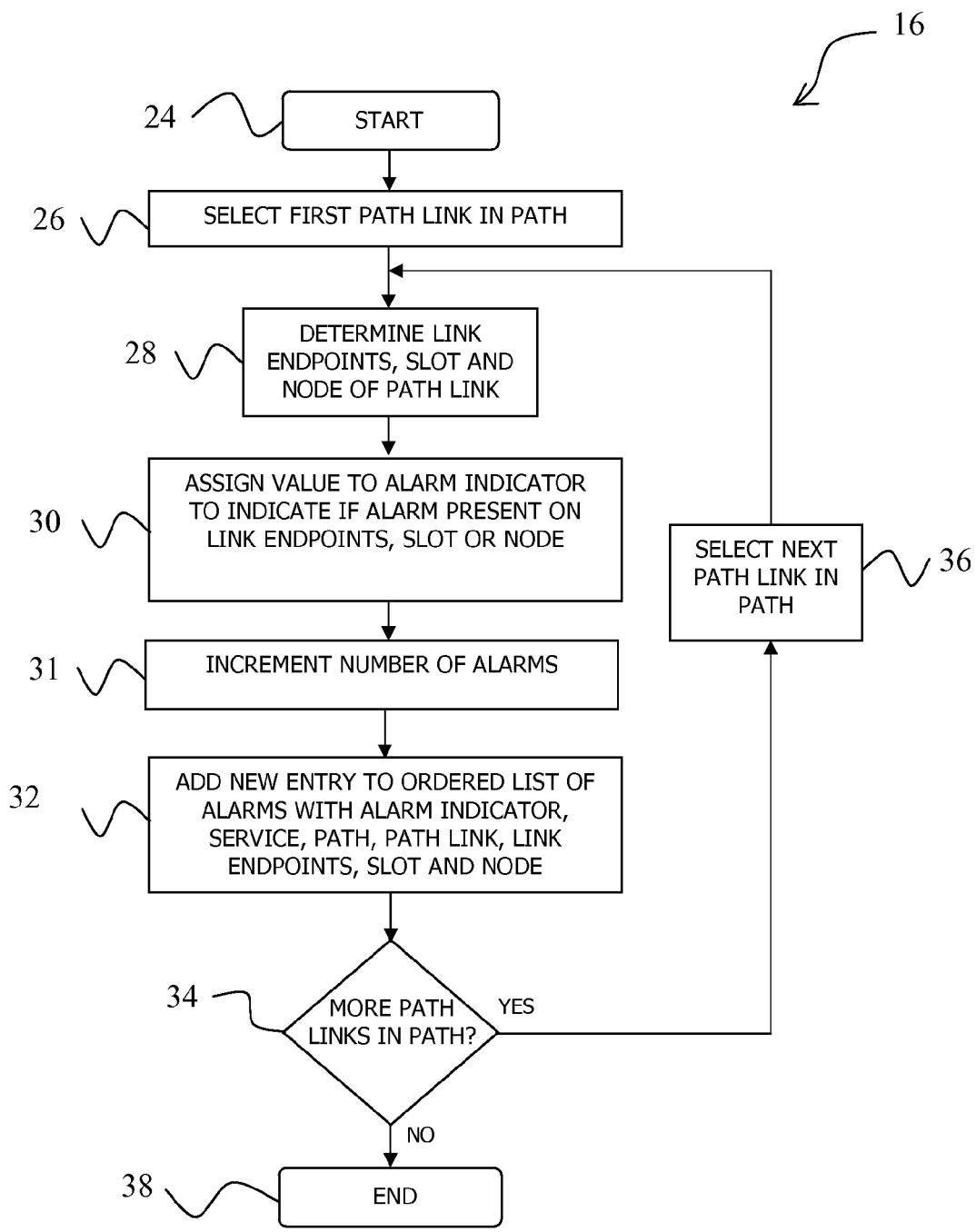
FIG. 2 is a flowchart illustrating the step 16 of generating an ordered list of alarms in the method of FIG. 1 in more detail.

Flowchart 16 shown in FIG. 2 illustrates the step 14 of FIG. 1 of generating an ordered list of alarms in the method of FIG. 1 in more detail. At the start (box 22), the first path link at the beginning of the path that comprises the service is selected (box 26). The network entities that carry the path link are determined, such as the starting link endpoint, the ending link endpoint, the slot and the node (box 28). A value is assigned to an alarm indicator to signify the presence of an alarm on any of these network entities, where the value one ("1") is assigned to indicate the presence of an alarm, and the value zero ("0") is assigned to indicate no alarm is present (box 30). A first counter for the number of alarms is incremented, and a second counter of the number of equipment alarms is incremented if an alarm is present on the slot or node (box 31). Next, for each network entity with an alarm, an entry is added to an ordered list of alarms (box 32). The entry includes the value of the alarm indicator, the alarm type and/or severity, the type of network entity, and the network entity identifier. For example, if an alarm is present on only the starting link endpoint, then only one entry is added to the ordered list of alarms. In another example, two entries are added to the ordered list of alarms if an alarm is present on the ending link endpoint and an alarm is also present on the slot. Then, if there are more path links in the path (exit YES from box 34), the next path link in the path that comprises the service is selected (box 36) and the part of the procedure (boxes 28 to 34) is repeated. If no more path links are present in the path, (exit NO from box 34), then the step 14 of FIG. 1 is complete (box 38).

Figures 3A, 3B, 3C, 3D:
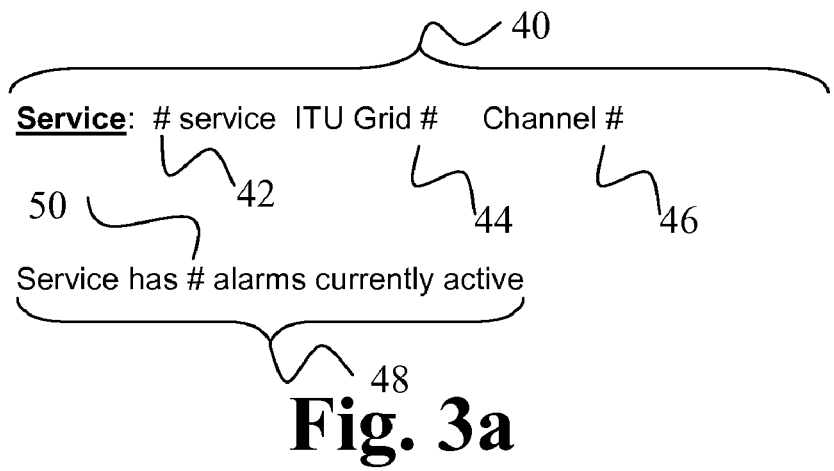
FIG. 3a illustrates an example of a header template for the transformed ordered list of alarms in the step 18 of FIG. 1.
FIG. 3b illustrates an example of a summary template for the transformed ordered list of alarms in the step 18 of FIG. 1.
FIG. 3c illustrates an example of a detail template for the transformed ordered list of alarms in the step 18 of FIG. 1.
FIG. 3d illustrates an example of a corrective procedure template for the transformed ordered list of alarms in the step 18 of FIG. 1.

The process of transforming the ordered list of alarms into one or more problem descriptions in step 18 of FIG. 1 is accomplished by using templates, examples of which are illustrated in FIGS. 3*a*, 3*b*, 3*c* and 3*d*. FIG. 3*a* illustrates an example of a header template, comprising a first header line 40 and a second header line 48. The first header line 40 includes text substitution markers 42, 44, 46, and the second header line 48 includes a text substitution marker 50. FIG. 3*b* illustrates an example of a summary template, comprising a summary line 52 including a text substitution marker 54. FIG. 3*c* illustrates an example of a detail template comprising a detail line 56, including text substitution markers 58, 60, 62, 64. FIG. 3*d* illustrates an example of a corrective procedure template, comprising a corrective procedure line 66, including text substitution markers 68, 70, 72, 74, 76, respectively.

Figure 4:
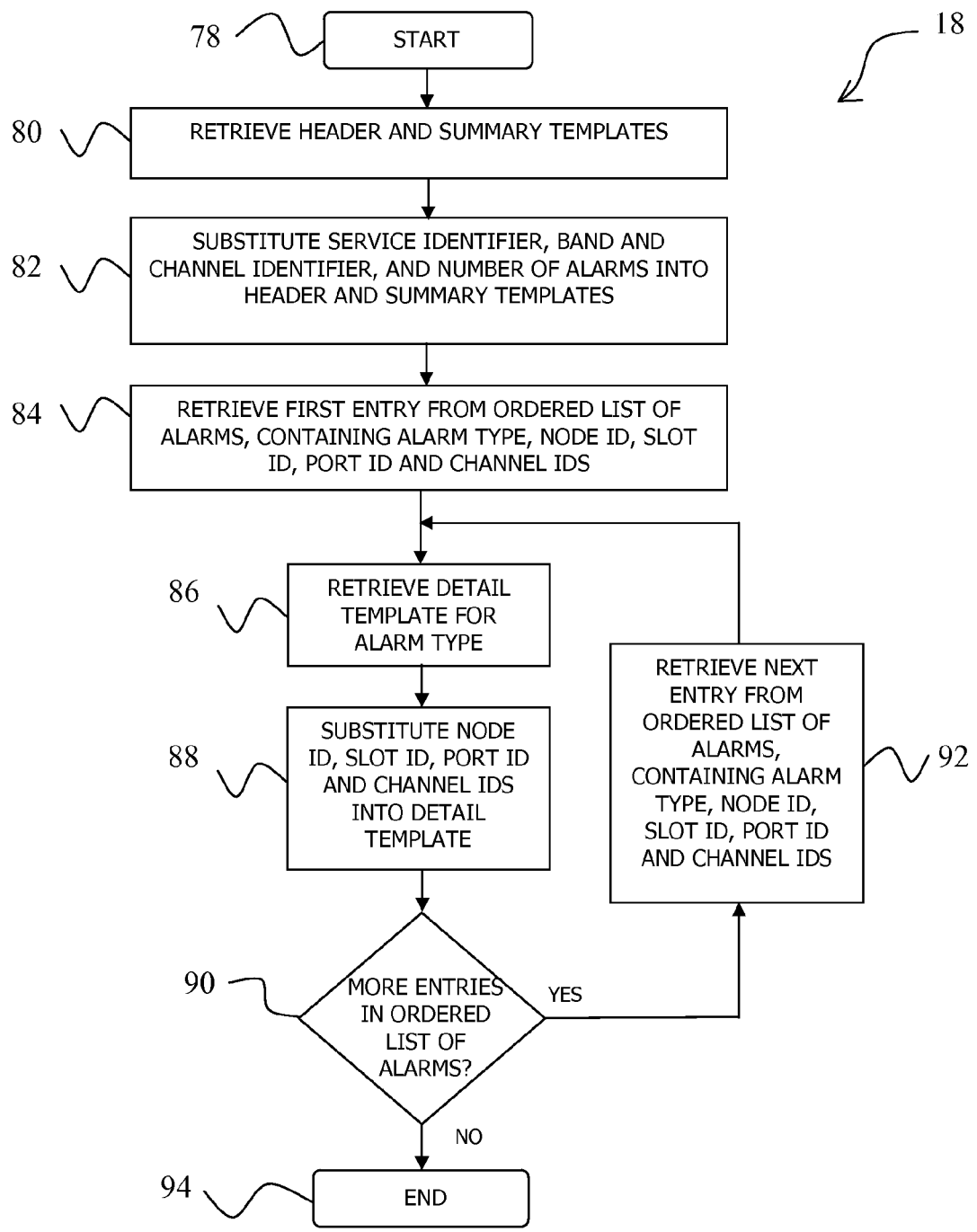
FIG. 4 is a flowchart illustrating the step 18 of transforming the ordered list of alarms into a description of problems of FIG. 1 in more detail.

The step 18 of FIG. 1 of transforming the ordered list of alarms into one or more problem descriptions for the service is illustrated in more detail in Flowchart 16 shown in FIG. 4. At the start (box 78), a first header line template 40 is retrieved for construction of the header portion of the problem descriptions (box 80), followed by the substitution of the values generated during the step 14 of FIG. 1 (box 82). The first header line template 40 is parsed to detect the position of the first text substitution marker 42. The service identifier that is provided (box 14 of FIG. 1) is substituted at the position of the first text substitution marker 42. The second and third text substitution markers 44, 46 are detected in the first header line template 40. The channel identifiers (box 14 of FIG. 1) are substituted at the position of the second and third text substitution markers 44, 46 in the first header line template 40. A second header line template 48 is retrieved, and the value of the first counter of the number of detected alarms (box 31 of FIG. 2) is substituted at the position of the text substitution marker 50. Next, a summary line template 52 is retrieved, and the value of the second counter of the number of equipment alarms (box 31 of FIG. 1) is substituted at the position of the text substitution marker 54. The first entry from the ordered list of alarms generated at step 16 of FIG. 1 is retrieved along with a detail line 56 (box 86). The value of the node, slot, port and the channel identifiers in the first entry of the ordered list of alarms are substituted at the position of the text substitution markers 58, 60, 62, 64 of the detail line 56, respectively (box 88). If there are more entries in the ordered list of alarms (exit YES from box 90) then the next entry from the ordered list of alarms generated at step 16 of FIG. 1 is retrieved (box 92) and the process continues (boxes 86 to 90). If there are no more entries in the ordered list of alarms (exit NO from box 90) then the process stops (box 94).

FIGS. 5 and 6 will be used to illustrate some network problems and associated alarms.

Figure 5A:
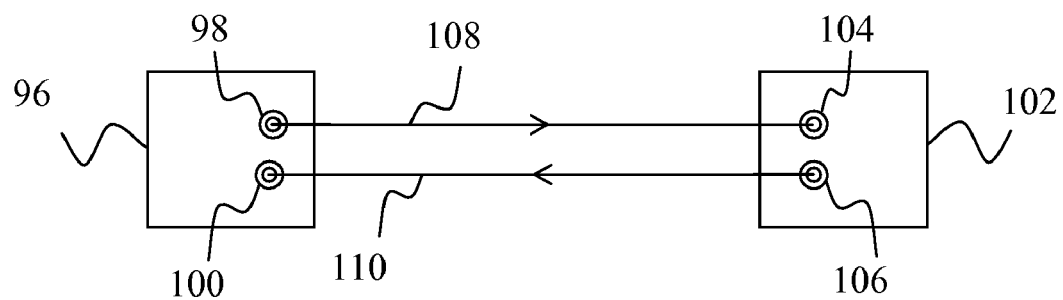
FIGS. 5 and 6 show diagrams illustrating certain exemplary network systems and associated faults and alarms.

FIG. 5*a* is a diagram illustrating an exemplary network system of two nodes for optical data transfer. A first node 96 is connected on port 98 by a first uni-directional optical link 108 to port 104 on a second node 102, and the second node 102 is connected on port 106 by a second uni-directional optical link 110 to port 100 on the first node 96. Data is transmitted from port 98 on node 96 and received by port 104 on node 102 by optical link 108, and data is transmitted from port 106 on node 102 and received by port 100 on node 96 by optical link 110. The uni-directional optical link 108 comprises a path from node 96 to node 102, and the uni-directional optical link 110 comprises a path from node 102 to node 96. The two paths comprise a service with bi-directional data flow. In this example, no alarms are reported by the nodes 96, 102, the ports 98, 100, 104, 106, nor by the optical links 108, 110.

Figure 5B:
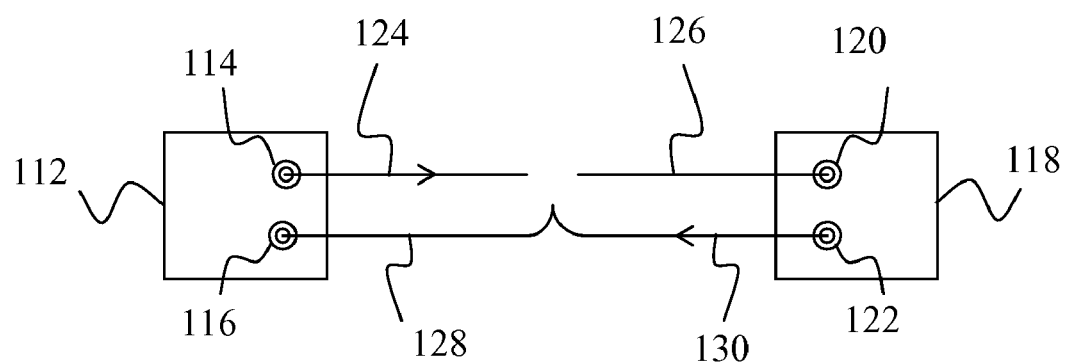

FIG. 5*b* is a diagram illustrating a similar system of two nodes for optical data transfer as illustrated in FIG. 5*a*, with a first node 112 with two ports 114, 116, and a second node 118 with two ports 120, 122. In this example, the first uni-directional optical link is broken between section 124 and section 126, and no data is received at port 120. The second uni-directional optical link is damaged between section 128 and section 130, and no data is received at port 116. As a consequence of the break between sections 124 and 126, two alarms are reported for the service at port 120, the first alarm indicating that the expected optical signal is lost, and the second alarm indicating that the expected channel "id" is missing. An alarm is reported for the service at port 116 due to the damage between sections 128 and 130, indicating that the optical power is out of range for the service(s) carried by the optical link.

Figure 6A:
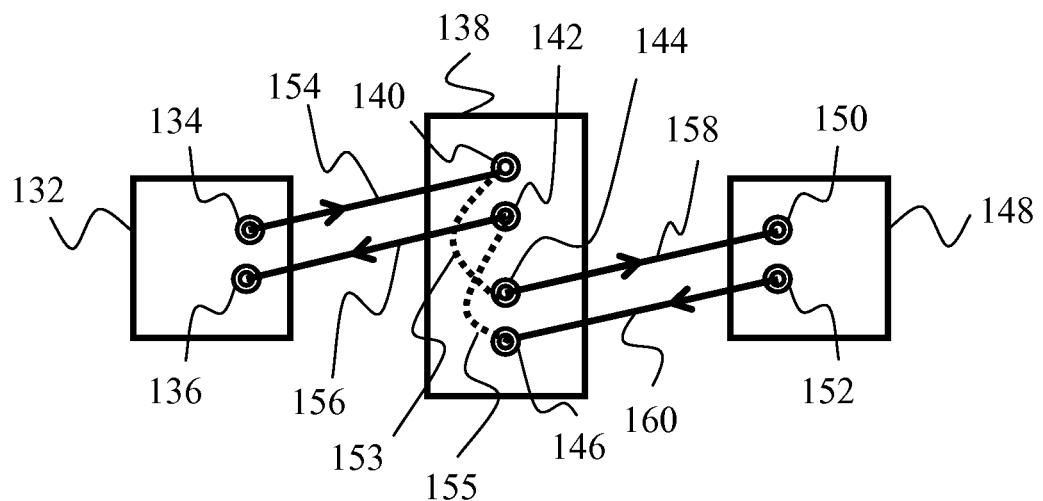

FIG. 6*a* is a diagram illustrating another typical network system for optical data transfer, and is similar to FIG. 5*a*, except three nodes are connected in series. A first node 132 is connected by a uni-directional optical link 154 from port 134 to port 140 on a second node 138, and by a second uni-directional optical link 156 from port 142 on the second node 138 to port 136 on the first node 132. The second node 138 is connected to a third node 148 by a uni-directional optical link 158 from port 144 on the second node 138 to port 150 on the third node 148, and by a second uni-directional optical link 160 from port 152 on the third node 148 to port 146 on the second node 138. A first optical cross-connect 153 connects port 140 to port 144, and a second optical cross-connect 155 connects port 142 to 146. In this example, the optical cross-connects 153, 155 increase the optical power flowing from port 140 to port 144, and from port 146 to port 142, respectively. Because the power of the optical signal between port 140 and port 144 is increased, an alarm for the service is reported at port 150 indicating that the channel power is out of range. Because the power of the optical signal from port 146 and port 142 is increased, an alarm for the service is reported at port 136 indicating that the channel power is out of range.

Figure 6B:
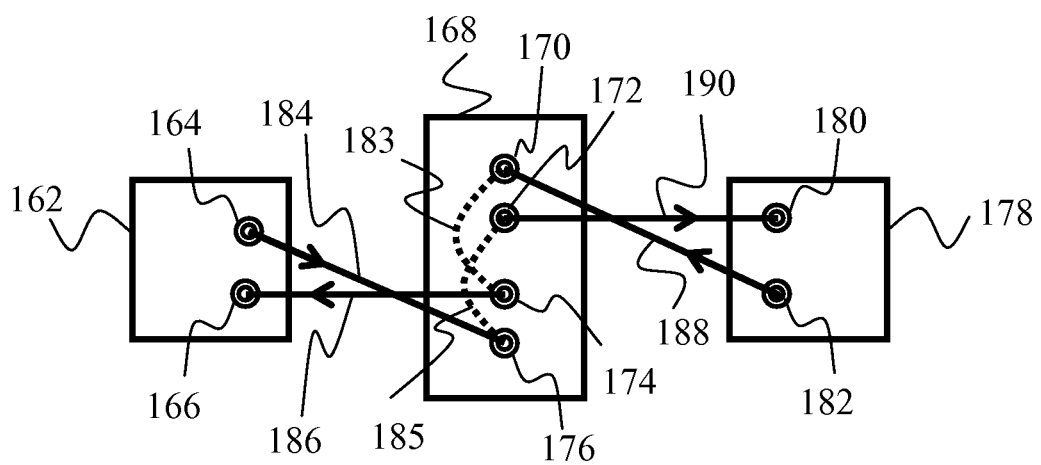

FIG. 6*b* is a diagram illustrating yet another network system for optical data transfer and is similar to FIG. 6*a*, except the optical links between nodes 162, 168 and 178 are connected incorrectly. Node 162 is incorrectly connected by a uni-directional optical link 184 from port 164 to port 176 on node 168, instead of to port 170 on node 168. Node 162 is also incorrectly connected by a uni-directional optical link 186 from port 174 on node 168 to port 166 on node 162, instead of being connected from port 172 on node 168. Node 168 is incorrectly connected to node 178 by a uni-directional optical link 190 from port 172 on node 168 to port 180 on node 178, instead of being connected from port 174 on node 168. Node 168 is also incorrectly connected by a uni-directional optical link 188 from port 182 on node 178 to port 170 on node 168, instead of being connected to port 176 on node 168. The optical cross-connects 183, 185 increase the optical power flowing from port 170 to port 174, and from port 176 to port 172, respectively. Because the power of the optical signal between port 170 and port 174 is increased, an alarm for the service is reported at port 180 indicating that the channel power is out of range. Because the power of the optical signal from port 176 and port 172 is increased, an alarm for the service is reported at port 166 indicating that the channel power is out of range. As a consequence of the incorrect connection of optical link 184 from port 164 to port 176, an alarm is reported at port 176 indicating that a channel "id" it received is unexpected, and an alarm is reported at port 176 indicating that an expected channel "id" is missing. As a consequence of the incorrect connection of optical link 190 from port 172 to port 180, an alarm is reported at port 180 indicating that a channel "id" it received is unexpected, and an alarm is reported at port 180 indicating that an expected channel "id" is missing. As a consequence of the incorrect connection of optical link 188 from port 182 to port 170, an alarm is reported at port 170 indicating that a channel "id" it received is unexpected, and an alarm is reported at port 170 indicating that an expected channel "id" is missing. As a consequence of the incorrect connection of optical link 186 from port 176 to port 166, an alarm is reported at port 166 indicating that a channel "id" it received is unexpected, and an alarm is reported at port 166 indicating that an expected channel "id" is missing.

Figure 7:
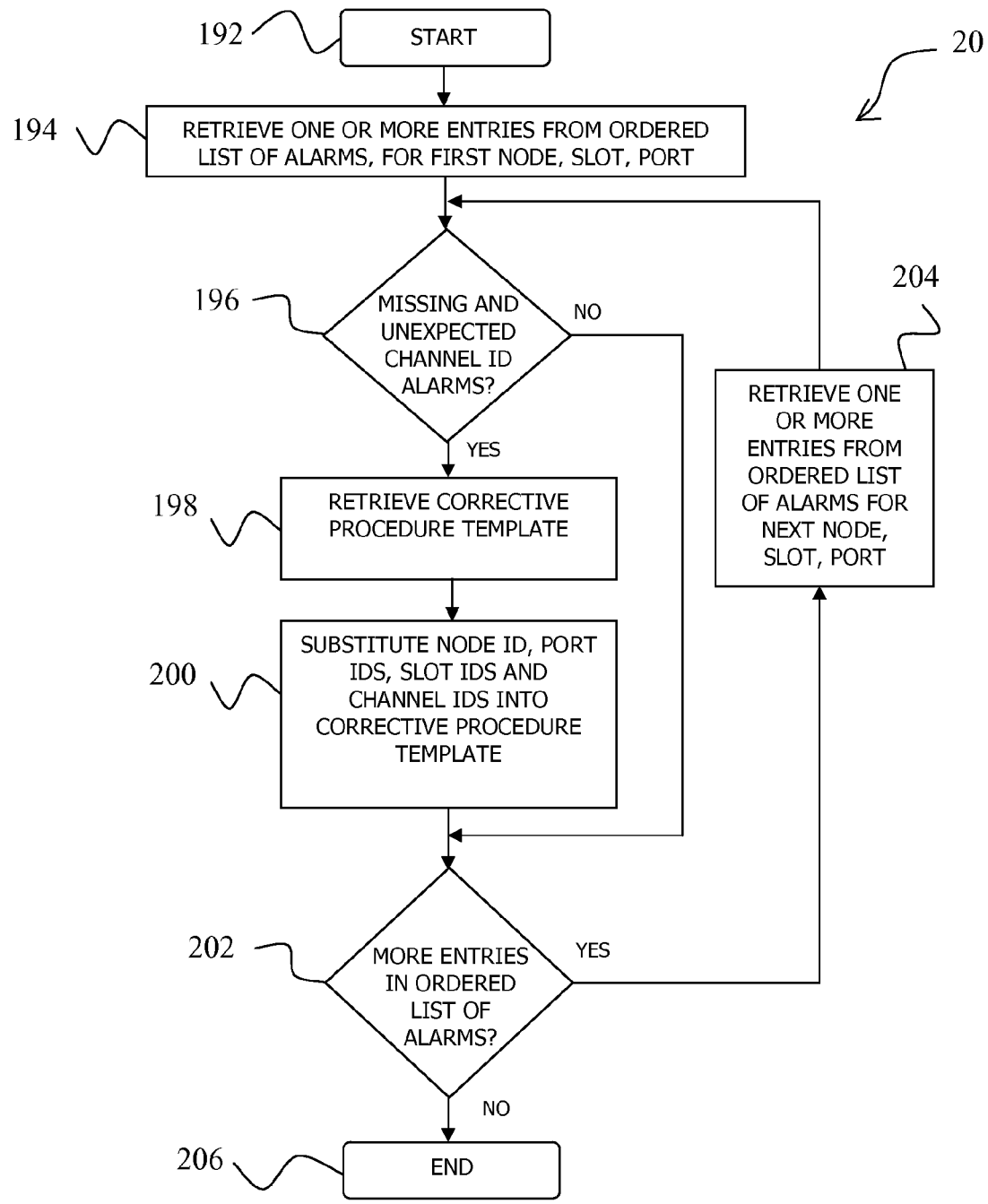
FIG. 7 is a flowchart illustrating the step 20 of transforming the ordered list of alarms in the method of FIG. 1 in more detail.
Figure 9:
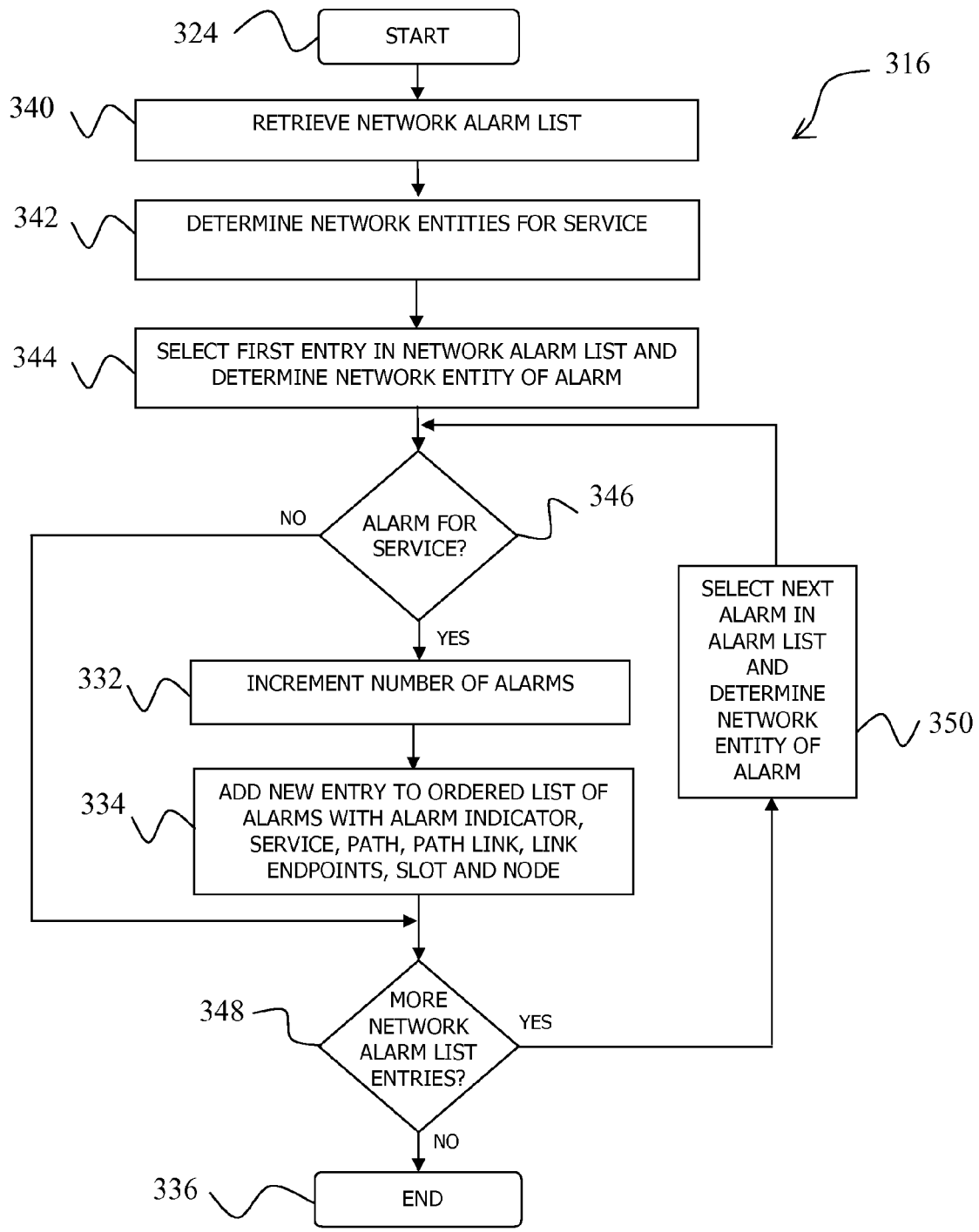
FIG. 9 is a flowchart illustrating a modified step 16 of generating an ordered list of alarms of FIG. 1 used in a method for describing a problem in a telecommunications network according to a second embodiment of the invention.

The step 20 of FIG. 1 of transforming the ordered list of alarms into a corrective procedure is illustrated in more detail in flowchart 20 shown in FIG. 7. At the start (box 192), a subset of one or more entries is retrieved from the ordered list of alarms, where each entry in the subset is for an alarm on the first port on the first slot on the first node carrying the path of the service (box 194). If the subset of entries contains an unexpected channel "id" alarm and a missing channel "id" alarm (exit YES from box 196), then a corrective procedure line template 66 is retrieved (box 198). The node identifier is substituted at the position of the first text substitution marker 68. The port identifier and slot identifier are substituted at the position of the second and third text substitution markers 70, 72, respectively, and the port identifier and slot identifier from the second entry of the subset are substituted at the position of the fourth and fifth text substitution markers 74, 76, respectively (box 200). If there are more entries in the ordered list of alarms (exit YES from box 202) then a subset of one or more entries is retrieved from the ordered list of alarms for the next port carrying the path of the service (box 204), and the process continues (boxes 196 to 202). If the subset of entries does not contain an unexpected channel "id" alarm and a missing channel "id" alarm (exit NO from box 196), then a subset of one or more entries are retrieved from the ordered list of alarms for the next port carrying the path of the service (box 204), and the process continues (boxes 196 to 202). If there are no more entries in the ordered list of alarms (exit NO from box 202) then the process stops (box 206).

Thus, a method for the description of one or more problems for a service in a telecommunications network and a corrective procedure is provided. This method may be used where a list of network entities for a service is provided, for example, at an NMS.

FIG. 8 illustrates a sample problem description generated according to the method of the first embodiment described above. A sample first and second header line 208, 210, corresponding to the templates 40 and 48 of FIG. 3a, a sample summary line 212, corresponding to the template 52 of FIG. 3b, sample detail lines 214, 216, 218, 220, corresponding to the template 56 of FIG. 3c, and a sample corrective procedure line 222, corresponding to the template 66 of FIG. 3d, respectively, are shown.

A method for describing one or more problems for a service in a telecommunications network of a second embodiment is similar to that of the first embodiment, except for the step 16 of generating an ordered list of alarms for the service being modified. The modified step 16 is illustrated by flowchart 316 shown in FIG. 7 in more detail. Similar elements in FIG. 2 and FIG. 7 are designated by the same reference numerals, incremented by 300. At the start (box 324), a network alarm list is retrieved, comprising a list of all alarms present on all network entities in the network (box 340). The network entities carrying the service are determined (box 342). The first entry in the network alarm list is selected and the network entity of the alarm list entry is determined (box 344). The network entity of the alarm list entry is compared to each network entity in the service, and if it is the same as one of the network entities in the service (exit YES from box 346), then a first counter for the number of alarms is incremented, and a second counter of the number of equipment alarms is incremented if the type of network entity is a node or slot (box 332). Next, an entry is added to an ordered list of alarms (box 334). The entry includes the value of the alarm indicator, the alarm type and/or severity, the type of network entity, and the network entity identifier. If there are more alarms in the network alarm list (exit YES from box 348), then the next entry in the network alarm list is selected and the network entity of the alarm list entry is determined (box 350), and the process continues (boxes 346 to 348). If the network entity of the alarm list entry is not the same as any of the network entities carrying the service (exit NO from box 346), then the next entry in the network alarm list is selected and the network entity of the alarm list entry is determined (box 350), and the process continues (boxes 346 to 348). If there are no more alarms in the network alarm list (exit NO from box 348), then the process stops (box 336).

Thus, a method for the description of one or more problems for a service in a telecommunications network and a corrective procedure is provided. This method may be used where an alarm list is provided without specifying the list of network entities for a service.

The methods of the embodiments described above have the advantage of avoiding the problems of clarity and intelligibility associated with typical network alarm displays, thereby reducing the probability of slow or erroneous network repairs associated with currently existing solutions, and reducing the lost revenue due to network faults.

Although specific embodiments of the invention have been described in detail, it will be apparent to one skilled in the art that variations and modifications to the embodiments may be made within the scope of the following claims.

What is claimed is:

1. A method implemented by a network management hardware server of a network for describing a problem in the network, the network comprising a plurality of network entities, the method comprising:

defining a service as a channel, from an originating network entity to a destination network entity, modulated by a dither tone specific to said channel, said originating network entity and said destination network entity belonging to said plurality of network entities, said service being carried by a path in the network;

selecting a subset of alarms associated with said service, the subset of alarms being selected from a list of alarms in the network;

grouping alarms in the subset of alarms associated with said service in a number of groups of alarms, each group of alarms being associated with said service and with a respective network entity from among said plurality of network entities;

ordering the groups of alarms according to a sequence in which they appear in a traversal of the path of the service in the network; and transforming each alarm in each group of alarms into a problem description for the service.

2. A method as described in claim 1, further comprising the step of providing a corrective procedure in response to at least one alarm in said subset of alarms.

3. A method as described in claim 1, wherein said grouping further associates each group of alarms with a type of said network entity, where a type of said network entity is one of a node, a slot, a card and a port.

4. A method as described in claim 1, wherein the step of grouping further comprises a step of associating at least one alarm in the subset of alarms with at least two network entities from among said plurality of network entities.

5. A method as described in claim 1, wherein the description is a verbal description.

6. A method as described in claim 1, wherein the description is a text description.

7. A method as described in claim 1, wherein the description is a pictorial description.

8. A method implemented by a network management hardware server of a network for describing a problem in the network, the network comprising a plurality of network entities, the method comprising:

defining a service as a channel, having a unique identifier, connecting an originating network entity to a destination network entity, wherein said originating network entity and said destination network entity belong to said plurality of network entities, and wherein said service is carried by a path in the network;

selecting a subset of alarms associated with said service, the subset of alarms being selected from a list of alarms in the network;

grouping alarms in the subset of alarms associated with said service in a number of groups of alarms, each group of alarms being associated with said service and with a respective network entity from among said plurality of network entities;

ordering the groups of alarms according to a sequence in which they appear in a traversal of the path of the service in the network; and transforming each alarm in each group of alarms into a problem description for the service;

wherein the step of transforming each alarm further comprises the step of forming at least one template including text substitution markers.

9. A method as described in claim 8, wherein the text substitution markers correspond to specific network entities from among said plurality of network entities.

10. A method as described in claim 8 wherein said path is a two-way path and the step of ordering the groups of alarms comprises ordering the groups of alarms in a direction of the path from a beginning of the path to an end of the path.

11. A method as described in claim 8 wherein said path is a two-way path and the step of ordering the groups of alarms comprises ordering the groups of alarms in a direction of the path from an end of the path to a beginning of the path.

12. A method implemented by a network management hardware server of a network for describing a problem in the network, the network comprising a plurality of network entities, the method comprising:

defining a service as a channel, from an originating network entity to a destination network entity, modulated by a dither tone specific to said channel, said originating network entity and destination network entity belonging to said plurality of network entities, said service being carried by a path in the network;

selecting a subset of alarms associated with said service, the subset of alarms being selected from a list of alarms in the network;

grouping the subset of alarms associated with said service in a number of groups of alarms, each group of alarms being associated with said service and with a respective network entity from among said plurality of network entities;

ordering the groups of alarms according to a sequence in which they appear in a traversal of the path of the service in the network; and transforming each alarm in each group of alarms into a problem description for the service;

wherein said problem triggers at least one of:
a missing channel identification alarm;
an unexpected dither tone alarm;
a loss of signal alarm; and
a channel power out of range alarm.

\* \* \* \* \*

UNITED STATES PATENT AND TRADEMARK OFFICE
CERTIFICATE OF CORRECTION

PATENT NO.       : 7,580,998 B2  
APPLICATION NO. : 10/606896  
DATED            : August 25, 2009  
INVENTOR(S)      : Gordon Bruce Scarth Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Fourteenth Day of September, 2010

David J. Kappos  
*Director of the United States Patent and Trademark Office*